Aug. 17, 1965  H. KRESS ETAL  3,201,356
MOLECULAR SIEVE CATALYST ACTIVATION PROCESS
Filed Sept. 27, 1961  2 Sheets-Sheet 1

FIGURE-I
HIGH TEMPERATURE HYDROISOMERIZION
CATALYST ACTIVATION STUDIES - PD/SIEVE CATALYST

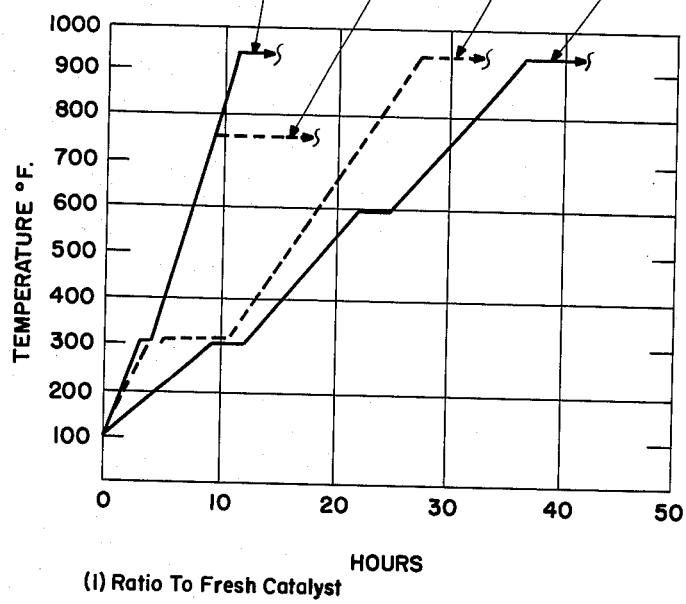

| Pressure, PSIG. | ATM | 450 | 450 | 450 | 450 |
|---|---|---|---|---|---|
| Max. Temp., °F. | 932 | 932 | 750 | 932 | 932 |
| Hours at 300°F. | 1 | 1 | 1 | 8 | 3 |
| Catalyst Performance | Good | Poor | Poor | Excellent | Poor |
| Palladium Crystallinity(1) | 1.4 | 2.9 | 2.9 | 0.7 | 3.2 |
| Sieve Crystallinity(1) | 1.0 | 1.0 | 1.0 | 1.0 | 1.0 |

(1) Ratio To Fresh Catalyst

Herbert Kress
Julius Philip Bilisoly    Inventors
John Nelson Beard, Jr.

By *Richard J. Nagel*

Patent Attorney

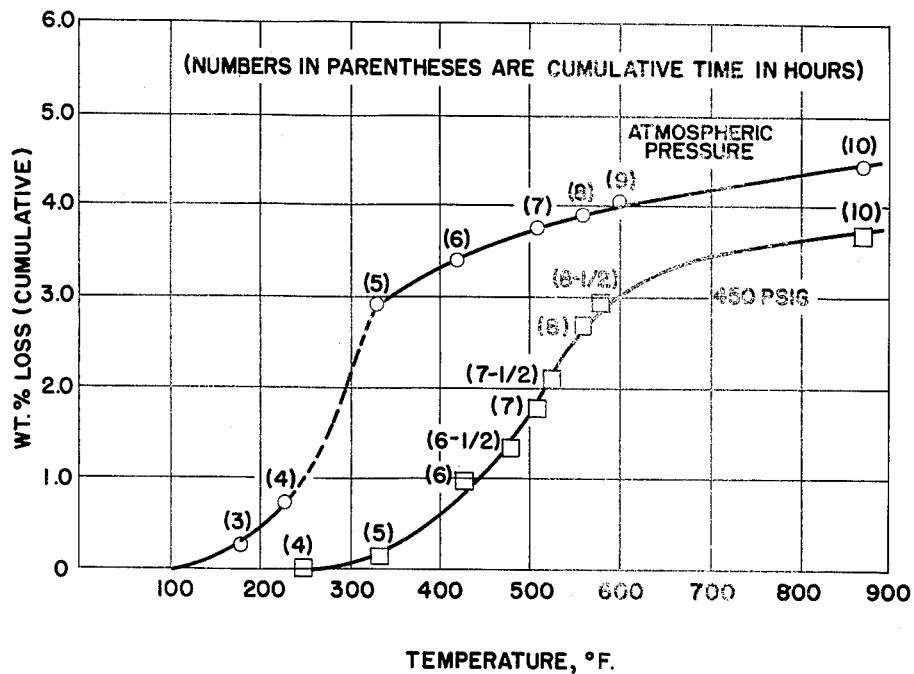

United States Patent Office 3,201,356
Patented Aug. 17, 1965

3,201,356
MOLECULAR SIEVE CATALYST ACTIVATION PROCESS
Herbert Kress, Julius Philip Bilisoly, and John Nelson Beard, Jr., Baton Rouge, La., assignors to Esso Research and Engineering Company, a corporation of Delaware
Filed Sept. 27, 1961, Ser. No. 141,129
9 Claims. (Cl. 252—455)

The present invention relates to the activation of molecular sieve catalysts. More particularly, the present invention relates to the activation of crystalline zeolitic (aluminosilicates) molecular sieve catalysts having uniform pore openings between 6 and 15 Angstroms and composited, impregnated or supporting a platinum group metal or metal compound. Still more particularly, the present invention is concerned with the activation of a large pore molecular sieve composited with a metal or compound of the platinum group such as platinum, palladium, rhodium, iridium, ruthenium and the like wherein the alkali metal content of the zeolite support is less than 10% by weight of the support calculated as the alkali oxide. Still more specifically the present invention is concerned with activation of such a catalyst which is to be employed under pressure in a hydrocarbon conversion process, and specifically in the hydroisomerization of light hydrocarbons boiling in the $C_4$ to $C_7$ range.

The hydrocarbon hydroisomerization process is normally carried out in the presence of a noble metal catalyst at elevated pressures and at temperatures dependent upon the boiling range and molecular weight of the hydrocarbon. Thus in general isomerization temperatures are in the range of 500 to 850° F. and pressures in the range of 200 to 800 p.s.i.g. When a pentane fraction is to be isomerized in the presence of hydrogen, a temperature of about 600 to 750° F. and a pressure of about 300 to 750 p.s.i.g. is employed.

Recently it has been found that catalysts having excellent hydroisomerization properties could be prepared from naturally occurring or synthetic molecular sieves having pore openings from 6 to 15 Angstrom units and silica/alumina ratios of about 2.5 to 1 to 5.5 to 1 and higher. They may be prepared in a manner well known in the art, the principle involved being to have the proper amount and ratios of silica, alumina and sodium hydroxide present. These processes are described, for instance, in U.S. 2,882,244 and 2,971,904. Faujasite, a natural zeolitic molecular sieve having pore openings of the nature described; i.e., large enough to permit ingress and egress of the reactants and the reaction products, has a silica/alumina ratio of about 5/1. In general, the large pore sieves may be prepared by having present in the reaction mixture $Al_2O_3$ as sodium aluminate, alumina sol and the like; $SiO_2$ as sodium silicate and/or silica gel and/or silica sol, and an alkaline hydroxide, either free, and/or in combination with the above components.

These large pore sieves are the supports employed in hydroisomerization reaction, after the sodium content has been decreased by base exchange. Thus, to make a suitable catalyst for hydroisomerization most and in some cases substantially all of the sodium is removed from the crystalline zeolitic sieve by base exchange. One way of doing this is by reacting the sodium sieve with ammonium ions; in calcination, the decationized or "Hydrogen" form of the sieve remains. Preferably, the soda content of the sieve lies in the range of 0.5 to 10%.

The step in which the decationized sieve is composited with the noble metal may be in the nature of a wet impregnation or base exchange reaction. Thus a platinum or palladium salt or an ammonium complex of these elements may be used. Suitable are, for instance, $Pt(NH_3)_4Cl_2$, $(NH_4)_2PtCl_6$, $Pd(NH_3)_4Cl_2$, $PdCl_2$ and the like. The amount of catalytic metal in the finished catalyst is ordinarily between 0.01 and about 5.0 weight percent, and preferably 0.1 to 2.0%.

The catalyst prepared by the general techniques described above is now ready for activation, and it is to this feature that the present invention principally applies.

Activation of a catalyst of the nature described above involves reduction of the palladium and dehydration of the sieve under conditions that crystallites of palladium are not formed and that the sieve structure is not destroyed. This can be effected reasonably well at atmospheric pressure, by extended treatment of the catalyst with hydrogen. However, this is impractical in a commercial scale in conjunction with a process operating under pressure, such as hydroisomerization, for it requires large quantities of once-through hydrogen, expensive compressors which, because of the inherent activity of the catalyst, would be on a stand-by basis for most of the life of the catalyst. Thus, it would be desirable to activate the catalyst under unit pressure—about 450 p.s.i.g. for $C_5$ isomerization—to provide adequate circulation so that the required heat can be supplied to the catalyst through the gas stream. This would eliminate the need for special gas handling equipment during activation.

However, when the activation technique of extended heating in the presence of once-through hydrogen up to about 900° F., found effective at atmospheric pressures, was employed in activating the catalyst with recycle hydrogen at unit (450 p.s.i.g.) pressure, an unsatisfactory catalyst was obtained. Though the catlayst had good initial activity, it quickly deactivated and lost both activity and selectivity in the hydroisomerization process. In examination by X-ray diffraction at the 39–41° angle, palladium crystallites were observed and these are associated with poor isomerization activity and poor selectivity.

It is, therefore, the principal object of the present invention to set forth a superior process for activating decationized molecular sieve catalyst adapted to be used in reactions under superatmospheric pressures.

It is a still further object of the present invention to set forth an improved process for activating a noble metal containing large pore molecular sieve catalyst at superatmospheric pressures.

Other and further objects and advantages of the present invention will become more clear hereinafter.

It has now been found that extended heating of the catalyst in the presence of recycle hydrogen under pressure is not per se adequate to produce a catalyst of satisfactory catalyst activity maintenance, even though this is completely satisfactory when the activation is carried out at atmospheric pressures with once-through hydrogen. Thus a catalyst containing about 4½% water and prepared in a manner previously described was heated in the presence of once-through hydrogen at atmospheric pressure so that the temperature advanced linearly from 80° F. to 300° F. in three hours; thereafter, it was held for 1 hour at 300° F., then the temperature was linearly increased to 932° F. in the space of 7 hours, and held at that temperature for 16 hours. A catalyst of excellent activity and activity maintenance resulted. However, when the same time and temperature schedule was applied to a sieve catalyst at 450 p.s.i.g. and with recycle hydrogen, the resulting catalyst was poor, caused substantial cracking, and rapidly deactivated.

It has now been found that it is not sufficient to dehydrate the catalyst in the activation step, but that the catalyst must be essentially dehydrated to a moisture content of less than 1.8 weight percent (volatile at 900° F. and atm. pressure) and preferably less than 1.0%, at a relatively low temperature of 290 to 320° F. prior to the high temperature activation step. Since it is considerably more difficult to remove water by heat transfer with a carrier gas at elevated pressures, it is probable that the temperatures and holding times adequate to remove water at atmospheric pressure were insufficient to dehydrate the catalyst at the lower temperatures under pressure. Furthermore, the catalyst when heated too rapidly to higher temperatures before sufficient water is removed, probably loses its crystalline structure by rupture of the sieve cells by the water being driven off too rapidly.

In accordance with the present invention, therefore, the catalyst is heated with hydrogen at a temperature below about 305° F. for a period sufficient to reduce the moisture content to less than 1.8 weight percent as previously stated. This time period will vary with the pressure of the activation gas and the initial water content of catalyst. Once the water content of the catalyst has reached this low figure, the further heating period for the activation-reduction step is no longer highly critical.

The invention may further be illustrated by the following specific example.

A large pore molecular decationized unactivated molecular sieve containing about 0.5% palladium, a silica/alumina mol ratio of about 5/1, a soda content of about 2 weight percent as Na₂O, and about 3–4% water was subject to activation under various conditions set forth below in Table I, and the resulting catalyst employed under hydroisomerization conditions to isomerize a pentane fraction.

TABLE I

*High temperature hydroisomerization catalyst activation studies*

| Test No. | A | B | C | D | E | F |
|---|---|---|---|---|---|---|
| Activation: | | | | | | |
| Total Time to Reach Max. Temp., Hrs. | 11 | 27 | 36 | 27 | 11 | 9 |
| Max. Temp., ° F. | 932 | 932 | 932 | 932 | 932 | 750 |
| Time @ Max. Temp., Hrs. | 16 | 16 | 16 | 16 | 16 | 16 |
| Time @ 300 ° F., Hrs. | 1 | 8 | ¹3 | 8 | 1 | 1 |
| Pressure, p.s.i.g. | Atm. | 450 | 450 | 450 | 450 | 450 |
| Gas Recycle | No | No | No | No | Yes | Yes |
| Catalyst Performance: | | | | | | |
| i-C₅/p-C₅ ² | 60 | 63 | 55 | 60 | 59 | 54 |
| Activity Maintenance | good | good | poor | good | poor | poor |
| Gas Recycle | No | No | No | No | Yes | Yes |
| Discharged Catalyst: | | | | | | |
| Surface Area | 660 | 490 | 672 | 650 | 578 | 665 |
| Pore Volume | 0.52 | 0.36 | | | 0.34 | 0.49 |
| Pd Crystallinity—Ratio to Fresh Cat. | 1.4 | 0.7 | 3.2 | 1.0 | 2.9 | 2.9 |
| Sieve Crystallinity—Ratio to Fresh Cat. | 0.94 | 0.94 | 1.0 | 1.0 | 1.0 | 0.94 |

¹ Temperature also held @ 600° F. for 3 hours.
² At 680° F., 450 p.s.i.g., 5 v./v./hr., 3,500 s.c.f. H₂/B, initial conversion level.

It will be seen from Table I that Run B (at 450 p.s.i.g.) in which heating at 300° F. was increased to 8 hours instead of 1 to 3 hours, gave a superior catalyst in spite of the more difficult pressure condition. Activity was 1.4 times the previous standard. It was also found that cracking was lower at the same conversion level.

Run C, also at 450 p.s.i.g., shows that even though the heat-up time to 932° F. was extended to 36 hours overall, an inferior catalyst was obtained because the heating time at 300° F. (3 hours) was too short. Other pilot plant runs at 450 p.s.i.g., using the heat-up schedule of A or a rate intermediate between A and C, with only 1 to 3 hours at 300° F., all gave inferior catalysts. Therefore, it is not the total heating time which is of primary importance but rather the time during the critical water removal period. Although the extended heating at 300° F. was shown necessary when activating at 450 p.s.i.g., extension of the critical heating period at any pressure should improve catalyst performance.

In these results, the lower the value of the relative X-ray palladium crystal (by X-ray diffraction measurement at 39°–41° angle), the better the dispersion and this is related to the catalyst activity. Similarly, the higher the value of the relative sieve crystal, the better the structure that is maintained.

These results clearly show that where the catalyst has been heated in the presence of hydrogen at 450 p.s.i.g. for 1 hour and three hours at 300° F. a poor catalyst resulted. Whereas when the same catalyst was heated for 8 hours under these conditions, an active catalyst resulted. These results are graphically depicted in FIGURE I.

In FIGURE II there is compared the dehydration of a catalyst under atmospheric and under 450 p.s.i.g. pressure.

In FIGURE II, the rates of water removal are compared at atmospheric pressure and at 450 p.s.i.g. The heating rate in both cases was approximately 80–100° F./hr. in the critical region of interest (290–320° F.). At atmospheric pressure, approximately 2.7% water had been removed when the catalyst reached 320° F. At 450 p.s.i.g., the slope of the line in the interval 290–320° F. is approximately 0.32% water/90°; at 90° F./hr., this is equal to:

$$\frac{0.32\%}{90° \text{ F.}} \times \frac{90° \text{ F.}}{\text{Hr.}} = 0.32\%/\text{hr.}$$

Therefore, since it is desirable to remove as much water in the interval 290–320° F. at 450 p.s.i.g. as would be removed at atmospheric pressure, the estimated time required at 290–320° F. and 450 p.s.i.g. is:

$$\frac{2.7\%}{0.32\%/\text{hr.}} = 8.4 \text{ hour}$$

This example illustrates why it was possible to carry out successful activation at 450 p.s.i.g. by holding the catalyst at 300° F. for 8 hours as shown in FIGURE I.

The process of the present invention may be subjected to many modifications. Thus, the initial part of the dehydration may be carried out with an inert gas, or even with air, though hydrogen is preferred.

What is claimed is:

1. An improved process for activating a crystalline zeolitic molecular sieve catalyst composited with a noble metal component which comprises maintaining said catalyst under superatmospheric pressure, dehydrating said catalyst to a water content of less than 1.8% by weight of catalyst at a temperature below about 320° F. and thereafter heating said catalyst in the presence of hydrogen at temperatures above 320° F.

2. An improved process for activating a crystalline zeolitic molecular sieve catalyst comprising a noble metal component and adapted for utilization in a superatmospheric pressure catalytic conversion zone which comprises heating said catalyst under catalytic conversion pressure in the presence of hydrogen at a temperature below about 320° F. for a period sufficient to decrease the moisture content of said catalyst to less than about 1.8% by weight, and thereafter heating said catalyst in the presence of hydrogen under said conversion pressure at a temperature above 320° F. until activation is substantially complete.

3. An improved process for activating a crystalline zeolitic molecular sieve having uniform pore openings from about 6 to 15 Angstrom units, comprising a noble metal component, said sieve being further characterized in that it contains no more than 10% sodium, calculated as Na₂O, and adapted for use in a hydrocarbon hydroisomerization reaction which comprises heating said catalyst in the presence of hydrogen at hydroisomerization pressure and at a temperature of about 290° to 320° F. for a period sufficient to decrease the moisture content of said catalyst to less than about 1% by weight, and thereafter gradually increasing said temperature to less than 1000° F.

4. The process of claim 3 wherein said catalyst is heated at 450 p.s.i.g. for about 8 hours at a temperature of about 290° to 320° F., and thereafter the temperature is raised gradually to about 932° F., and the temperature maintained at said latter level for about 16 hours.

5. The process of claim 4 wherein recycle hydrogen is employed as the activating gas.

6. An improved process for activating a crystalline zeolitic molecular sieve catalyst which comprises heating a crystalline zeolitic molecular sieve catalyst having uniform pore openings of about 6 to 15 Angstrom units and containing between 0.01 and 5.0% by weight of a noble metal, less than 10% by weight of sodium, calculated as $Na_2O$, and more than 1.8% by weight of moisture at a temperature below about 320° F. and at superatmospheric pressure for a period sufficient to dehydrate said catalyst to a water content of less than 1.8% by weight, thereafter heating said catalyst in the presence of hydrogen at a temperature above 320° F. for a period sufficient to complete activation of said catalyst.

7. A process according to claim 6 wherein said noble metal is palladium.

8. An improved process for activating a crystalline zeolitic molecular sieve catalyst which comprises heating a crystalline zeolitic molecular sieve catalyst having uniform pore openings in the range of 6 to 15 Angstrom units and containing between 0.01 and 5.0% by weight of palladium, a silica/alumina mol ratio of about 5/1, a soda content of about 2 weight percent (as $Na_2O$) and about 3 to 4% moisture at a temperature of about 290 to 305° F. and at superatmospheric pressure for a period sufficient to decrease the moisture content to no more than 1.8%, thereafter heating said catalyst in the presence of hydrogen to a maximum temperature of between 900 and 1000° F. and continuing said heating at said maximum temperature for a period sufficient to complete activation of said catalyst.

9. An improved process for activating a crystalline zeolitic molecular sieve catalyst which comprises heating a crystalline molecular sieve catalyst having uniform pore openings in the range of 6 to 15 Angstrom units and containing about 0.5% palladium, a silica/alumina mol ratio of about 5/1, a soda content of about 2 wt. percent (as $Na_2O$) and about 3 to 4% moisture at a temperature in the range of about 290 to 305° F. and under superatmospheric pressure with recycled hydrogen for a period sufficient to decrease the moisture content of said catalyst to less than about 1.0% by weight, thereafter gradually increasing the temperature to a maximum temperature of between about 900 and 1000° F. and continuing heating said catalyst with said hydrogen at said maximum temperature for a period sufficient to complete activation of said catalyst.

References Cited by the Examiner

UNITED STATES PATENTS

| | | | |
|---|---|---|---|
| 2,971,903 | 2/61 | Kimberlin et al. | 260—683.65 |
| 2,971,904 | 2/61 | Gladrow et al. | 260—676 |
| 3,002,935 | 10/61 | Pitzer | 252—455 |
| 3,003,974 | 10/61 | Baker et al. | 260—683.65 |

ALPHONSO D. SULLIVAN, *Primary Examiner.*